United States Patent
Nakano

[11] Patent Number: 6,098,683
[45] Date of Patent: Aug. 8, 2000

[54] PNEUMATIC TIRE WITH CIRCUMFERENTIAL BELT LAYER/ INCLINED BELT LAYER LAMINATE

[75] Inventor: Tatsuo Nakano, Tokyo, Japan

[73] Assignee: Bridgestone Corporation, Tokyo, Japan

[21] Appl. No.: 09/075,255

[22] Filed: May 11, 1998

Related U.S. Application Data

[62] Division of application No. 08/525,025, Sep. 8, 1995, Pat. No. 5,804,002.

[30]  Foreign Application Priority Data

Sep. 19, 1994 [JP] Japan ................................ 6-223307

[51] Int. Cl.$^7$ ................ B60C 9/18; B60C 9/20; B60C 9/22
[52] U.S. Cl. .................. 152/527; 152/526; 152/531; 152/532; 152/533; 152/537
[58] Field of Search .................................. 152/531, 532, 152/537, 533, 526, 527

[56]  References Cited

U.S. PATENT DOCUMENTS

| | | |
|---|---|---|
| 5,004,031 | 4/1991 | Kadota et al. . |
| 5,154,217 | 10/1992 | Kanamaru . |
| 5,383,507 | 1/1995 | Sato et al. .......................... 152/531 X |

FOREIGN PATENT DOCUMENTS

| | | |
|---|---|---|
| 679109 | 9/1966 | Belgium . |
| 2212244 | 7/1974 | France . |
| 2236227 | 3/1973 | Germany . |
| 26 02 424 A1 | 7/1977 | Germany ........................... 152/531 |
| 2-81706 | 3/1990 | Japan . |
| 6-48112 | 2/1994 | Japan . |
| 6-48114 | 2/1994 | Japan . |
| 1648806 | 5/1991 | U.S.S.R. ............................. 152/537 |

OTHER PUBLICATIONS

Patent Abstracts of Japan, vol. 17, No. 240, May 14, 1993, JP–A–04 365603 (Sumitomo Rubber Ind Ltd), Dec. 17, 1992.
Patent Abstracts of Japan, vol. 16, No. 384, Aug. 17, 1992, JP–A–04 126609 (Bridgestone Corp), Apr. 27, 1992).

*Primary Examiner*—Adrienne C. Johnstone
*Attorney, Agent, or Firm*—Sughrue, Mion, Zinn & Macpeak & Seas, PLLC

[57]  ABSTRACT

The belt of a pneumatic tire is a laminate of a circumferential belt layer and an inclined belt layer, the circumferential belt layer comprising a plurality of reinforcing elements arranged substantially in parallel with the equatorial plane of the tire and coated with rubber, and the inclined belt layer comprising a plurality of reinforcing elements inclined with respect to the equatorial plane of the tire and coated with rubber, wherein at least in the coating rubber of the circumferential belt layer and the coating rubber of the inclined belt layer adjoining each other, the modulus of elasticity of the coating rubber of the circumferential belt layer is lower than that of the coating rubber of the inclined belt layer. The pneumatic tire of the invention avoids the disadvantage generated by addition of a circumferential belt layer while strengthening the circumferential rigidity by the circumferential belt layer.

9 Claims, 3 Drawing Sheets

PNEUMATIC TIRE WITH CIRCUMFERENTIAL BELT LAYER/ INCLINED BELT LAYER LAMINATE

This is a divisional of application Ser. No. 08/525,025 filed Sep. 8, 1995 now U.S. Pat. No. 5,804,002.

BACKGROUND OF THE INVENTION

1. Field of the Invention

This invention relates to a pneumatic tire, and in particular to a pneumatic tire wherein the crown portion of the carcass thereof is reinforced by a circumferential belt layer comprising reinforcing elements arranged substantially in parallel with the equatorial plane of the tire in straight, wavy or zigzag form.

2. Description of the Prior Art

In pneumatic tires, many proposals have been made for strengthening the circumferential rigidity of the belt by the addition of a circumferential belt layer to an inclined belt layer comprising reinforcing elements inclined with respect to the equatorial plane of the tire.

For example, Japanese Patent Application Laid-Open No. 2-81706 discloses a tire comprising a circumferential belt layer for strengthening the circumferential rigidity which comprises wavy reinforcing elements and attaining vulcanization almost without preventing expansion of the diameter of the belt in tire manufacture.

However, the addition of the circumferential belt layer causes an increase in the heat generation of the belt, because of not only increasing the thickness of the belt but also increasing the strain generated between the circumferential belt layer and inclined belt layer during rotation of the tire. Also the heat generation of the belt causes deterioration of the coating rubber of the belt and finally causes so-called "heat separation" between the cords and the coating rubber.

Also, when the tire is under load, the tread and the belt in the ground-contacting area of the tread are compressed radially inwards, and therefore the rubber coating reinforcing elements of the belt moves toward the belt edge portions. The quantity of displacement of the coating rubber becomes a maximum at the belt edge portions, especially at the edge portions of the circumferential belt layer, because the displacement of the coating rubber in the width direction is restricted. Therefore strain concentrates at the edge portions of the circumferential belt layer to cause separation.

It is, therefore, an object of the present invention to provide a tire which overcomes the disadvantage caused by addition of a circumferential belt layer, especially belt separation, while strengthening circumferential rigidity by the addition of the circumferential belt layer.

SUMMARY OF THE INVENTION

The present invention in one aspect provides a pneumatic tire comprising a belt and a tread disposed radially outside the crown portion of a carcass toroidally extending between a pair of beads, said belt being a laminate of a circumferential belt layer and an inclined belt layer, said circumferential belt layer comprising a plurality of reinforcing elements arranged substantially in parallel with the equatorial plane of the tire and coated with rubber, and said inclined belt layer comprising a plurality of reinforcing elements inclined with respect to the equatorial plane of the tire and coated with rubber, wherein at least as regards the coating rubber of said circumferential belt layer and the coating rubber of said inclined belt layer adjoining each other, the coating rubber of the circumferential belt layer has a lower modulus of elasticity than that of the coating rubber of the inclined belt layer.

It is advantageous for preventing belt edge separation that in the rubber layer between the reinforcing elements in the circumferential belt layer and those in the inclined belt layer adjoining each other in the vicinity of both edge portions of the belt, the thickness of the coating rubber of the circumferential belt layer accounting for the rubber layer is larger than the thickness of the coating rubber of the inclined belt layer.

The invention in another aspect provides a pneumatic tire comprising a belt and a tread disposed radially outside the crown portion of a carcass toroidally extending between a pair of beads, said belt being a laminate of a circumferential belt layer and an inclined belt layer, said circumferential belt layer comprising a plurality of reinforcing elements arranged substantially in parallel with the equatorial plane of the tire and coated with rubber, and said inclined belt layer comprising a plurality of reinforcing elements inclined with respect to the equatorial plane of the tire and coated with rubber, wherein a control rubber layer having a higher modulus of elasticity than that of the coating rubber of the circumferential belt layer is disposed outside of the widthwise edge of said circumferential belt layer.

As to the above circumferential belt layer, there can be applied not only the usual structure in which substantially straight cords or monofilaments as the reinforcing elements are arranged in the circumferential direction, but also a structure in which wavy cords or monofilaments are used and a structure in which a ribbon comprising several cords or monofilaments coated with rubber is spirally wound.

DESCRIPTION OF THE PREFERRED EMBODIMENTS

Figure 1:
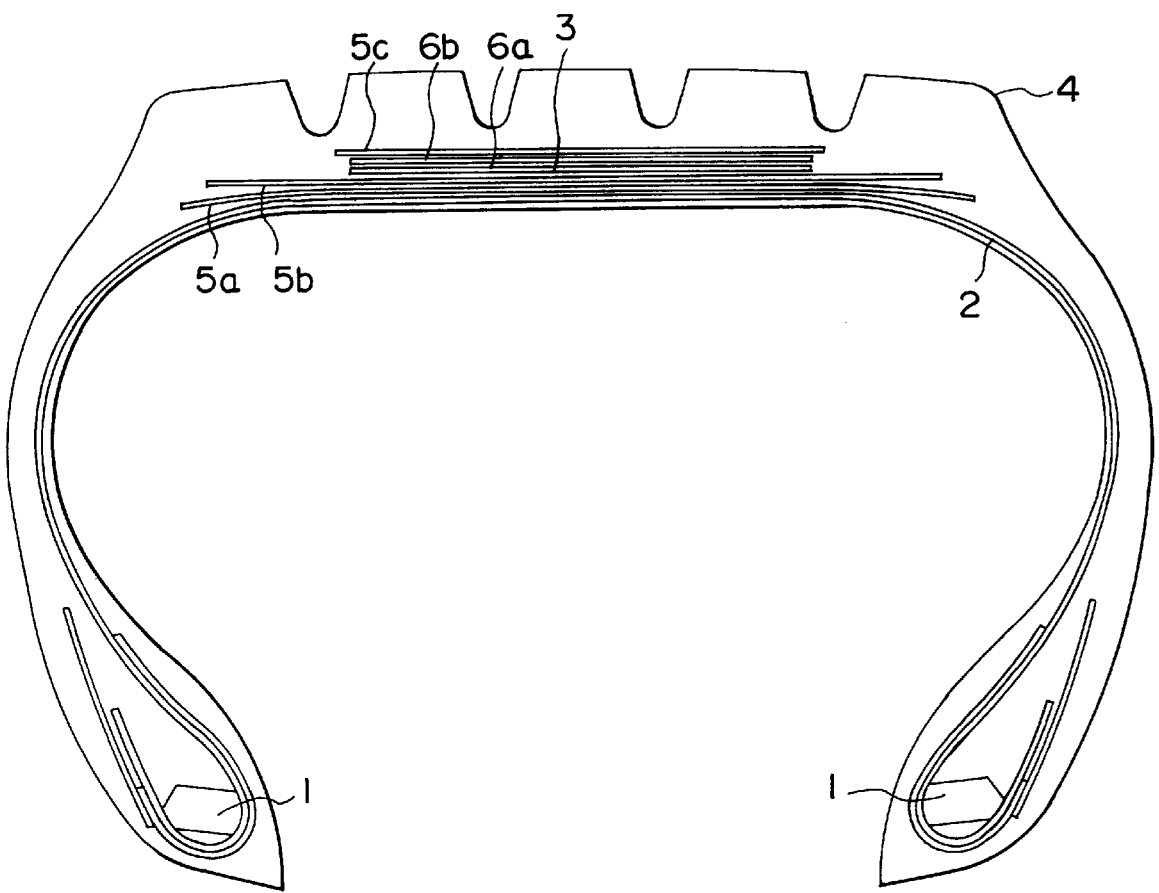
FIG. 1 is a sectional view in the width direction of an embodiment of a tire according to the invention.

FIG. 1 illustrates the section of a typical pneumatic tire in the tire width direction, according to the invention.

This pneumatic tire has a belt 3 comprising at least one inclined belt layer 5a, 5b and at least one circumferential belt layer 6a, 6b, and a tread 4 disposed radially outside the crown portion of a carcass 2 toroidally extending between a pair of beads 1.

In the illustrated embodiment, the belt 3 comprises two circumferential belt layers 6a, 6b disposed radially outside two inclined belt layers 5a, 5b which are in turn disposed radially outside the carcass 2. The reference 5c indicates a belt-protection layer covering the outermost layer of the belt 3, which can be omitted.

Figure 2:
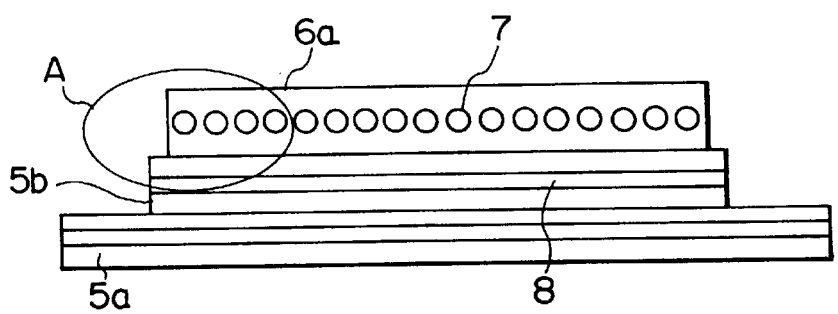
FIG. 2 is a sectional view of a belt construction of a tire according to the invention.

In the belt 3, as FIG. 2 illustrates, it is important that at least as regards the coating rubber of the circumferential belt layer 6a and the coating rubber of the inclined belt layer 5b adjoining each other, the coating rubber of the circumferential belt layer 6a has a lower modulus of elasticity than that of the coating rubber layer of the inclined belt layer 5b. That is, lowering the modulus of elasticity decreases heat generation at the belt 3. Although it is important that especially the coating rubber of the circumferential belt layer 6a has a lower modulus of elasticity than that of the coating rubber of the adjoining inclined belt layer 5b, in a similar manner the coating rubber of the circumferential belt layer 6b can have a lower modulus of elasticity than that of the coating rubber of the inclined belt layer 5a.

Figure 3:
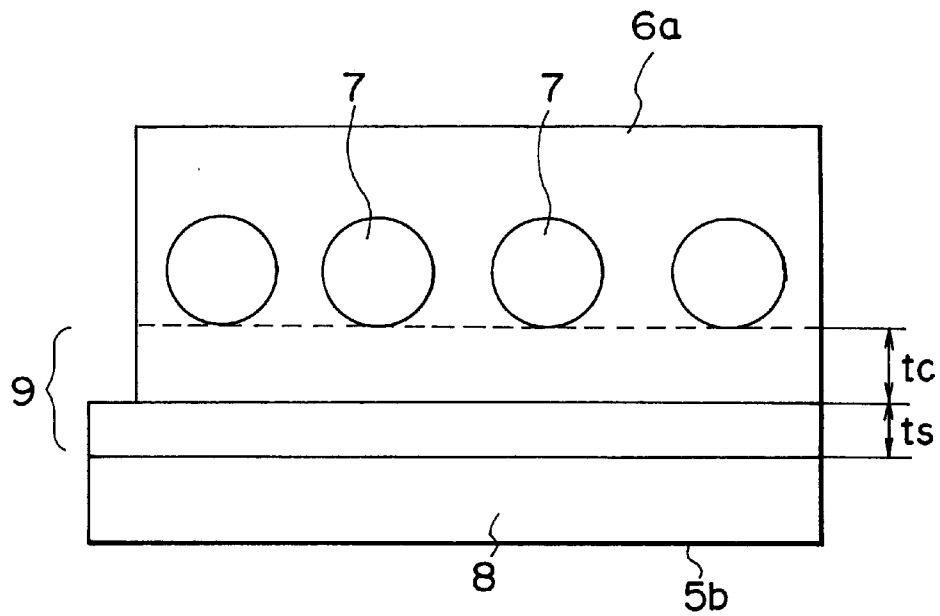
FIG. 3 is an enlarged view of the portion A of FIG. 2.

Furthermore, as illustrated in FIG. 3, which is an enlarged view of the vicinity of the belt edge portion A of FIG. 2, in the rubber layer 9 between the reinforcing elements 7 of the circumferential belt layer 6a and the reinforcing elements 8 of the inclined belt layer 5b, the thickness (tc) of the coating rubber of the circumferential belt layer 6a is larger than the thickness (ts) of the coating rubber of the inclined belt layer 5b. That is, the ratio of the coating rubber of the circumferential belt layer 6a accounting for the rubber layer 9 is larger than that of the coating rubber of the inclined belt layer 5b, as a result of which the strain concentrating especially at the vicinity of the circumferential belt layer 6a is mitigated.

Figure 4:
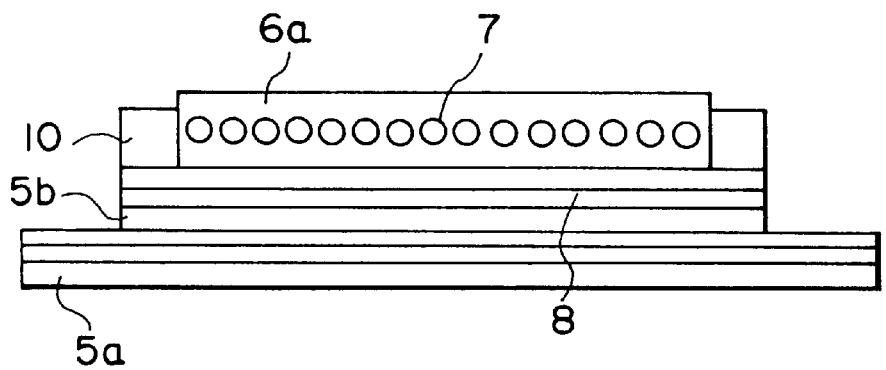
FIG. 4 is a sectional view of another belt construction of a tire according to the invention.

As FIG. 4 illustrates, disposing a control rubber layer 10 having a higher modulus of elasticity than that of the coating rubber of the circumferential belt layer 6a outside both the widthwise edges of the circumferential belt layer 6a restricts the displacement of the coating rubber of the circumferential belt layer, which is effective in restraining the strain at the circumferential belt layer 6a.

In the present invention, lowering the modulus of elasticity of the coating rubber of the circumferential belt layer 6a, and also increasing the thickness tc of the coating rubber of the circumferential belt layer 6a accounting for the rubber layer 9 relative to the thickness ts of the coating rubber of the adjoining inclined belt layer 5b, and/or disposing the control rubber layer 10 outside both edges of the circumferential belt layer 6a, decreases heat generation and restrains separation at the belt ends.

Figure 5:
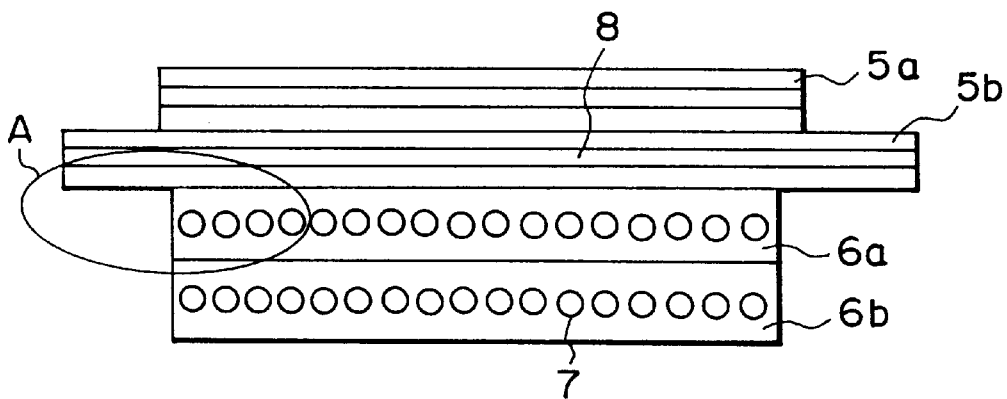
FIG. 5 is a sectional view of a further belt construction of a tire according to the invention.
Figure 6:
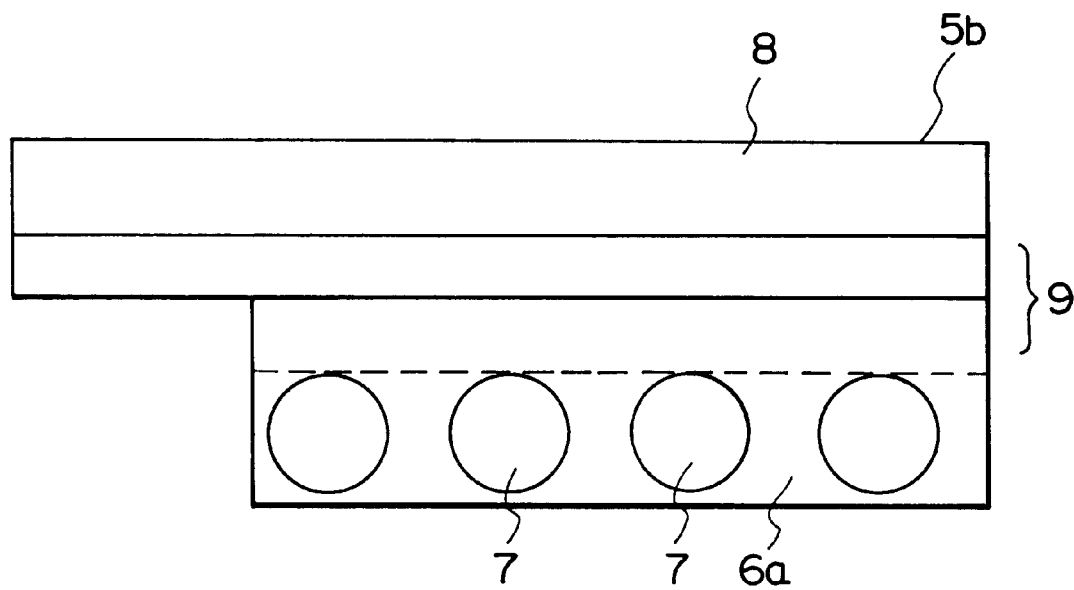
FIG. 6 is an enlarged view of the portion A of FIG. 5.
Figure 7:
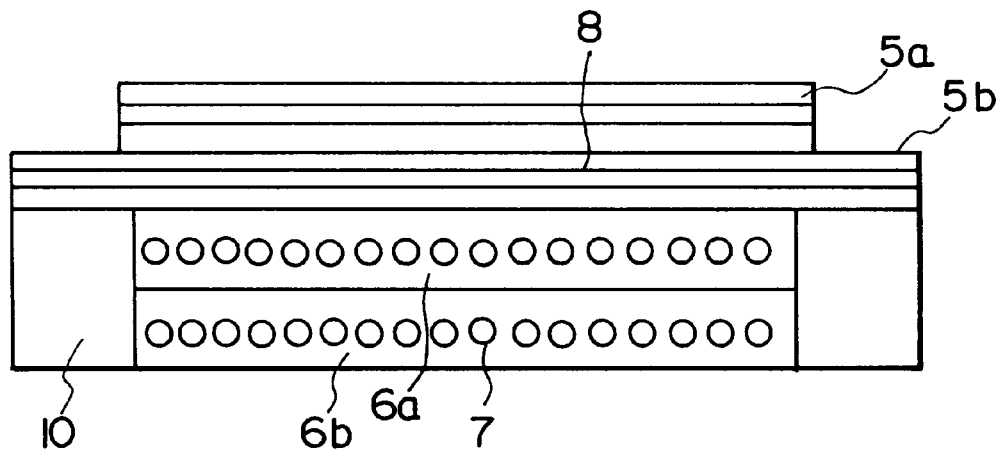
FIG. 7 is a sectional view of a still further belt construction of a tire according to the invention.

The arrangement of the circumferential belt layer and inclined belt layer is not limited to the embodiments shown in FIGS. 2, 3 and 4. For example, as shown in FIGS. 5, 6 and 7, two circumferential belt layers 6a, 6b can be disposed radially below two inclined belt layers 5a, 5b on the carcass. In this arrangement of the belt layers also, the modulus of elasticity of the coating rubber of the circumferential belt layer 6a is lower than that of the adjoining inclined belt layer 5b. Moreover, it is preferable that the ratio of the coating rubber of the circumferential belt layer 6a accounting for the rubber layer 9 is increased (see FIG. 6) and/or a control rubber layer 10 is disposed outside both edges of the circumferential belt layer 6a (see FIG. 7).

As stated above, a tire having a belt which comprises an inclined belt layer in addition to a circumferential belt layer has the problem of belt separation caused by heat generation and the strain concentrating at both edges of the circumferential belt layer(s).

In this invention, restraining heat generation between the belt layers has been considered. Although the cause of heat generation is the increase of the thickness of the belt and the strain generating between the circumferential belt layer and the inclined belt layer during tire rotating, the increase of thickness of the belt is difficult to avoid.

In general, when a tire is under load, the transformation of the tread of the tire has a regular transformation tendency because the curved surface of the tread becomes flat. Therefore, the input between the circumferential belt layer and the inclined belt layer have a regular strain tendency, so the strain energy generated can be represented in the following expression:

(strain energy)=(modulus of elasticity)×(strain)$^2$

This expression shows that lowering the modulus of elasticity of rubber is effective in decreasing the strain energy and therefore heat generation caused by the strain is restrained by lowering the modulus of elasticity of the coating rubber of the inclined belt layer and/or the circumferential belt layer.

However, it is difficult to lower the modulus of elasticity of the coating rubber of the inclined belt layer because the modulus has great influence on the rigidity of the inclined belt layer. However, in the case of the circumferential belt layer, the modulus of elasticity has a relatively small influence on the rigidity. Therefore said modulus can be lowered, by which heat generation can be restrained.

It is advantageous to restrain heat generation if the modulus of elasticity of the coating rubber of the circumferential belt layer is 20–45 kgf/mm$^2$ as the value of stress in a 100% tensile test at room temperature. In the case of the modulus of elasticity of the coating rubber of the inclined belt layer, because said modulus is 55–65 kgf/mm$^2$ as a value of stress in a 100% tensile test at room temperature that can maintain the rigidity of the belt, it is preferable when restraining heat generation to set the modulus in the vicinity of the lower limit.

Because belt edge separation is caused by the concentration of stress in the vicinity of the belt edge, especially the edge of the circumferential belt layer, the above stated lowering of the modulus of the coating rubber of the circumferential belt layer is disadvantageous to the concentration of the stress. Therefore the ratio of the coating rubber of the circumferential belt layer accounting for the rubber layer between the reinforcing elements of the circumferential belt layer and the reinforcing elements of the adjoining inclined belt layer is increased, by which the strain concentrating at the circumferential belt layer can be mitigated.

That is, the ability to mitigate the strain generated is enhanced by increasing the ratio of the coating rubber of the circumferential belt layer of which the modulus of elasticity is lowered accounting for the rubber layer, and such a large strain concentration as to cause the separation is restrained. It is preferable that the ratio of the coating rubber of the circumferential belt layer accounting for the rubber layer 9 is in the range of more than 0.5–0.7. Because thickening the entire rubber layer is disadvantageous for restraining heat generation, the strain mitigation ability of the rubber layer is improved by enhancing the ratio of the coating rubber of the circumferential belt layer.

Furthermore the rigidity of the inclined belt layer and the minimum required thickness of the inclined belt layer in tire manufacture are secured, respectively.

The control rubber layer 10 of which the modulus of elasticity is larger than that of the coating rubber of the circumferential belt layer 6a is disposed outside both edges of the circumferential belt layer respectively, by which separation may be avoided by restricting the displacement of the rubber layer during rotation under load and restraining the strain generation.

The control rubber layers 10, as FIGS. 4 and 7 illustrate, are disposed outside both edges of the circumferential belt layer and extend in the circumferential direction with a rectangular section, respectively. It is preferable that the modulus of elasticity of the control rubber is 1.3–3.0 times as much as that of the coating rubber of the circumferential belt layer. It is also preferable, to avoid heat generation which accompanies increasing the amount of the rubber, that the width and thickness of the section shape of the control rubber layer are 10–20 mm and 1.0–2.0 mm, respectively.

The invention will be further described with reference to the following embodiments.

There were provided pneumatic radial tires for trucks and buses having a tire size of 11/70R22.5 and a belt construction including a circumferential belt layer as illustrated in FIGS. 1 and 2, as described in more detail in Table 1, respectively. The circumferential belt layer comprised wavy cords (0.8 mm φ, wave length: 36.6 mm, amplitude: 1.3 mm) of 3+9×0.19 mm with end count: 28 cords/50 mm. The inclined belt layer comprised cords (1.4 mmφ) of 3+9+15× 0.23 mm at an angle of 18' with respect to the equatorial plane of the tire with end count: 23 cords/50 mm.

In Table 1, the modulus of elasticity and the thickness of coating rubber of each belt layer are represented by a ratio on basis of a Comparative tire in which the modulus of elasticity and the thickness were 57 kgf/mm$^2$ and 0.3 mm in the circumferential belt layer, and 57 kgf/mm$^2$ and 0.3 mm in the inclined belt layer, respectively.

Each of these tires was run on a drum at a speed of 50 km/h under normal load after being inflated to a normal inflation pressure of 8.0 kgf/cm$^2$, and was tested in respect of the tire temperature, running distance when any failure occurred, and the failure state. These test results are given in Table 1, represented by an index on the basis that the corresponding values of the Comparative tire are 100.

The tire temperature was measured by stopping the drum ten hours after the tire had started to run on the drum and by inserting a thermocouple-type beam-thermometer into the vicinity of the edge portion of the circumferential belt layer.

various changes and modifications may be made without departing from the spirit and scope of the invention.

I claim:

1. A pneumatic tire comprising a belt and tread disposed radially outside the crown portion of a carcass toroidally extending between a pair of beads, said belt being a laminate of a circumferential belt layer and an inclined belt layer, said circumferential belt layer comprising a plurality of reinforcing elements arranged substantially in parallel with the equatorial plane of the tire and coated with rubber, and said inclined belt layer comprising a plurality of reinforcing elements inclined with respect to the equatorial plane of the tire and coated with rubber, wherein a control rubber layer having a higher modulus of elasticity than that of said coating rubber of the circumferential belt layer is disposed outside of the widthwise edge of said circumferential belt layer.

2. The pneumatic tire according to claim 1 wherein said reinforcing elements in said circumferential belt layer are substantially straight cords.

3. The pneumatic tire according to claim 1 wherein said reinforcing elements in said circumferential belt layer are substantially straight monofilaments.

4. The pneumatic tire according to claim 1 wherein said reinforcing elements in said circumferential belt layer are arranged as a ribbon of cords coated with rubber that is spirally wound.

5. The pneumatic tire according to claim 1 wherein said reinforcing elements in said circumferential belt layer are arranged as a ribbon of monofilaments coated with rubber that is spirally wound.

6. The pneumatic tire according to claim 1 wherein said circumferential belt layer is a plurality of circumferential belt layers disposed radially outside said inclined belt layer.

7. The pneumatic tire according to claim 6 wherein said inclined belt layer is a plurality of inclined belt layers disposed radially outside said carcass.

TABLE 1

|  | Modulus of elasticity of the coating rubber | | Thickness of the coating rubber | | | | | |
| --- | --- | --- | --- | --- | --- | --- | --- | --- |
|  | Inclined belt layer | Circumferential belt layer | Inclined belt layer | Circumferential belt layer | Control rubber layer | Tire temperature | State of Separation | Running distance |
| Comparative tire | 1 | 1 | 1 | 1 | No | 100 | Large Separation at belt end | 100 |
| Invention tire 1 | 1 | 0.7 | 1 | 1 | No | 95 | Large Separation at belt end | 107 |
| Invention tire 2 | 1 | 0.7 | 1 | 1.3 | No | 90 | Small Separation at belt end | 113 |
| Invention tire 3 | 1 | 0.7 | 1 | 1 | Yes*) | 95 | Small Separation at belt end | 110 |
| Invention tire 4 | 1 | 0.7 | 1 | 1.3 | Yes*) | 90 | No Separation | 125 |
| Invention tire 5 | 1 | 1 | 1 | 1 | Yes*) | 100 | Large Separation at belt end | 105 |

*)The modulus of elasticity is 1.3 times.

According to the invention, strengthening the circumferential rigidity of a tire by adding a circumferential belt layer can be attained without heat generation and belt edge separation. Therefore it is possible to improve the tire performance.

While the invention has been particularly shown and described with reference to certain preferred embodiments thereof, it will be understood by those skilled in the art that 8. The pneumatic tire according to claim 1 wherein said circumferential belt layer is positioned radially below said inclined belt layer.

9. The pneumatic tire according to claim 8 wherein the modulus of elasticity of the coating rubber of said circumferential belt layer is lower than that of said adjoining inclined belt layer.

* * * * *